US007124058B2

(12) United States Patent
Namaky et al.

(10) Patent No.: US 7,124,058 B2
(45) Date of Patent: Oct. 17, 2006

(54) OFF-BOARD TOOL WITH OPTICAL SCANNER

(75) Inventors: Hamid Namaky, South Russell, OH (US); Robert A. Roberts, South Euclid, OH (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 11/024,453

(22) Filed: Dec. 30, 2004

(65) Prior Publication Data

US 2006/0161390 A1 Jul. 20, 2006

(51) Int. Cl.
*G06F 11/30* (2006.01)
*G21C 17/00* (2006.01)

(52) U.S. Cl. .................... 702/183; 340/825.72; 701/29

(58) Field of Classification Search ................ 702/122, 702/183, 184, 185, 188; 701/29, 33, 35, 701/45, 111; 340/438, 825.72
See application file for complete search history.

(56) References Cited

U.S. PATENT DOCUMENTS

2004/0054503 A1* 3/2004 Namaky ..................... 702/183
2005/0021294 A1* 1/2005 Trsar et al. ................. 702/183
2005/0046584 A1* 3/2005 Breed .................... 340/825.72
2005/0065678 A1* 3/2005 Smith et al. .................. 701/29

* cited by examiner

*Primary Examiner*—Bryan Bui
*Assistant Examiner*—John Le
(74) *Attorney, Agent, or Firm*—Baker & Hostetler LLP

(57) ABSTRACT

Exemplary embodiments of an improved OBT are provided. General concepts of the invention include an OBT combined with an optical scanner. In one embodiment, the OBT includes a housing that at least partially retains a processor; vehicle communication circuitry for linking to a vehicle diagnostic system, and an optical reader for optically obtaining additional information. Another exemplary embodiment includes an OBT used in conjunction with a bar code scanner and/or a camera. In addition, a method of obtaining diagnostic data from the vehicle diagnostic system and optically obtaining information using an off-board device is provided.

31 Claims, 7 Drawing Sheets

OFF-BOARD TOOL WITH OPTICAL SCANNER

FIELD OF THE INVENTION

The present invention relates generally to the field of electronic testing devices, and more specifically to "off-board tools," such as inspection maintenance tools, scan tools, and code readers for retrieving information from vehicle diagnostic.

BACKGROUND OF THE INVENTION

The Environmental Protection Agency (EPA) set forth guidelines for states to follow in designing and running vehicle inspection and maintenance (I/M) programs. The guidelines are designed to reduce pollutants in the air that are produced by vehicles having defective or improperly working emissions systems. The guidelines for automobile emissions testing programs set forth the minimum requirements to satisfy the Clean Air Act (CAA). Under the CAA, the states must periodically inspect vehicles that travel on the roadways. Included in the periodic inspection for newer vehicles is the checking of the on-board diagnostic system.

Vehicles emissions inspections programs have traditionally analyzed the vehicle exhaust under simulated driving conditions. One way to simulate driving conditions is by placing the vehicle on rollers and running the vehicle at various speeds. Placing the vehicle on rollers and running the vehicle at selected speeds is undesirable because it is inconvenient, time consuming, and potentially dangerous.

Another method of performing a vehicle emissions inspection is to analyze the data stored on the on-board diagnostic system that was gathered during actual driving conditions. All vehicles manufactured since 1996 are required to have an on-board vehicle diagnostic system. The on-board vehicle diagnostic system includes one or more computer modules that are used to control various components, such as the engine, transmission, anti-lock brake system etc. The on-board vehicle diagnostic systems monitor and store data indicative of emissions levels, such as, for example, data from the oxygen sensor, the catalytic converter, the EGR valve, etc., that are obtained during actual driving conditions over a period of time and during key "off" conditions. Once the vehicle has been driven for a sufficient period of time for the on-board diagnostic system to fully evaluate the emissions system, the on-board diagnostic system sets a status flag. The status flag, or readiness code, is used to verify that error codes have not been cleared immediately prior to having the vehicle inspected.

A typical I/M program for 1996 and later models includes a manual examination of the components and an electronic examination of the on-board diagnostic system. First, the inspector enters the vehicle identification number into a computer terminal, so that the vehicle identification number can be reported to the state along with the results of the emissions test. The vehicle identification number is either entered manually, or entered by scanning a bar code label that may be located on the vehicle door. After entering the VIN number, the vehicle is pulled forward and the inspector performs a visual check of the dashboard display, status indication, (or the malfunction indicator light "MIL") and selected emissions control components. Finally, the inspector performs an inspection of the on-board vehicle diagnostic system. Typically, an "Off-Board Tool," (OBT) such as a scan tool, code reader or similar hand-held instrument is used to extract data from the vehicle on-board diagnostic system in the form of Diagnostic Trouble Codes (DTCs), monitors, etc.

"Off-Board Tools," such as, for example, scan tools, and code reader are testing devices that interface with vehicle diagnostic systems to access, display, and/or print vehicle diagnostic information. On-Board Diagnostics Version II Scan Tools are one commonly known type of scan tool and are governed by a number of standards, such as, for example, SAE J1978 Rev. April 2002 and SAE J1979 Rev. April 2002.

Optical scanners are known and include bar code scanners. Generally, there are two types of bar code scanners, less-expensive contact scanners, and more expensive non-contact scanners. The less-expensive contact scanners, also known as manual scanners, or one-pass scanners require close, or actual physical contact, between the scanner and the bar code. Manual scanners or one-pass scanners include, for example, light pen bar code readers. As the name implies, non-contact scanners do not require direct contact with the bar code. Non-contact scanners include, for example, scanners that use a CMOS camera sensor, and scanners that use lasers and osculating mirrors. The latter are often found in hand-held devices at checkout lines.

Typically, test centers that scan in VIN numbers utilize a scanner at one station and an OBT at a second station. Placing the vehicle at one location to enter the vehicle identification number and moving the vehicle to a second station to retrieve data from the vehicle diagnostic system increases the time and space required to perform an emissions test.

SUMMARY OF THE INVENTION

Exemplary embodiments of an improved OBT are provided. General concepts of the invention include an OBT combined with an optical scanner. In one embodiment, the OBT includes a housing that at least partially retains a processor, vehicle communication circuitry for linking to a vehicle diagnostic system, and an optical reader for optically obtaining additional information. Another exemplary embodiment includes an OBT used in conjunction with a barcode reader and/or a camera. In addition, a method of obtaining diagnostic data from the vehicle diagnostic system and optically obtaining information using an off-board device is provided.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to example principles of this invention.

DETAILED DESCRIPTION OF THE INVENTION

Figure 1A:
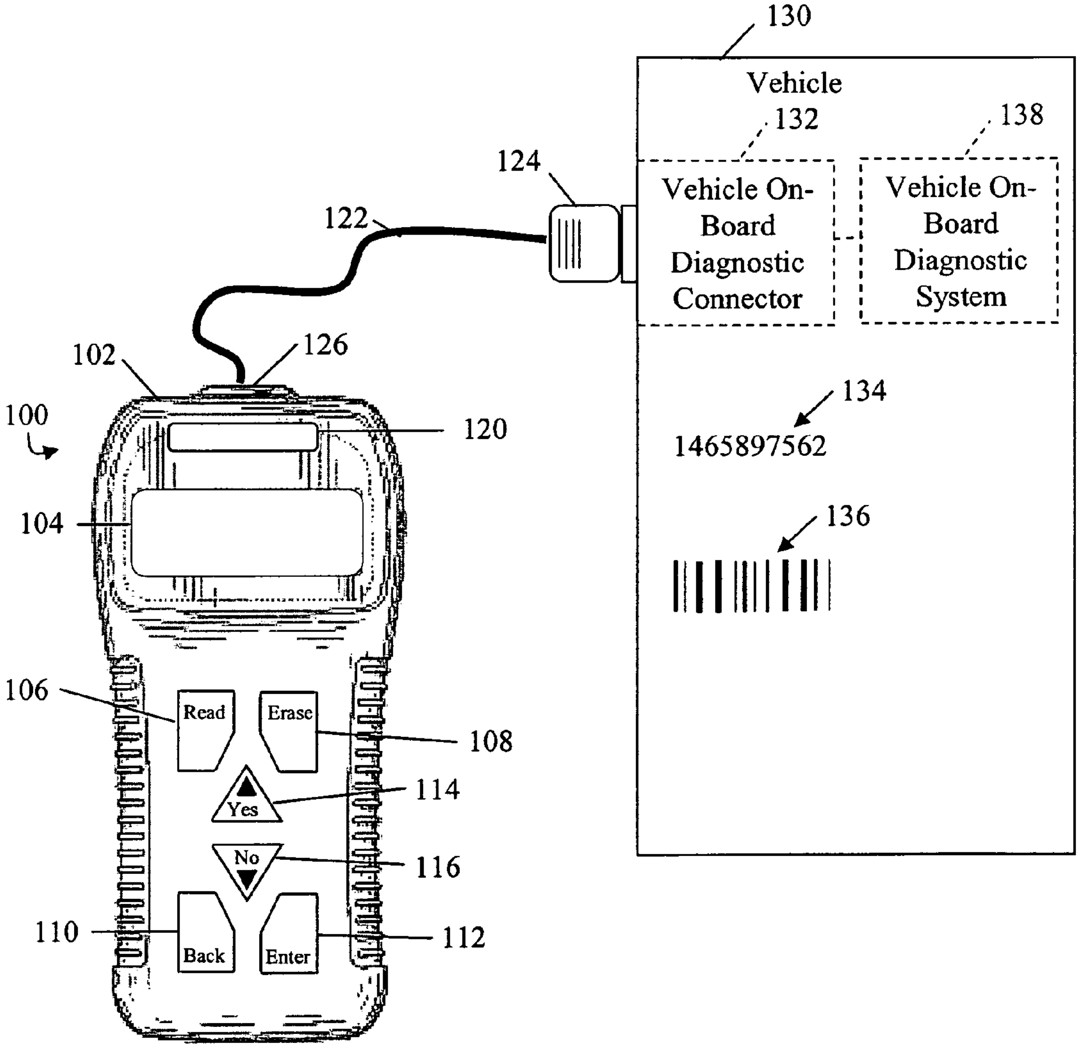
FIG. 1A is an exemplary embodiment of an OBT connected to a vehicle having an on-board diagnostic system, wherein the OBT has an optical scanner on its front surface.

The following includes definitions of exemplary terms used throughout the disclosure. Both singular and plural forms of all terms fall within each meaning. Except where noted otherwise, capitalized and non-capitalized forms of all terms fall within each meaning:

"Circuit communication" as used herein indicates a communicative relationship between devices. Direct electrical, electromagnetic, optical connections and indirect electrical, electromagnetic, and optical connections are examples of circuit communication. Two devices are in circuit communication if a signal from one is designed to be received by the other, regardless of whether the signal is modified by some other device. For example, two devices separated by one or more of the following—amplifiers, filters, transformers, optoisolators, digital or analog buffers, analog integrators, other electronic circuitry, fiber optic transceivers, or even satellites—are in circuit communication if a signal from one is communicated to the other, even though the signal is modified by the intermediate device(s). As another example, an electromagnetic sensor is in circuit communication with a signal if it is designed to receive electromagnetic radiation from the signal. As a final example, two devices not directly connected to each other, but both capable of interfacing with a third device, e.g., a CPU, are in circuit communication. Also, as used herein, voltages and values representing digitized voltages are considered to be equivalent for the purposes of this application and thus the term "voltage" as used herein refers to either a signal, or a value in a processor representing a signal, or a value in a processor determined from a value representing a signal.

"Software", as used herein includes, but is not limited to, one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"Logic" as used herein includes, but is not limited to hardware, firmware, software and/or combinations of each to perform a function(s) or an action(s). For example, based on a desired application or needs, logic may include a software controlled microprocessor, discrete logic such as an application specific integrated circuit (ASIC), or other programmed logic device. Logic may also be fully embodied as software.

FIG. 1A illustrates an exemplary off-board device (OBT) 100 for retrieving data from a vehicle on-board diagnostic system and for optically obtaining additional information. The exemplary OBT 100 is configured to retrieve vehicle data, and is preferably configured to communicate with a remote computer (not shown) in conjunction with an I/M program. Optionally, OBT 100 is stand alone scan tool and the additional information may be obtained for a print out, for storing the obtained data or comparing data, such as, for example, the VIN number of the vehicle to the VIN number stored in the vehicle diagnostic system. The exemplary OBT 100 includes an optical scanner 120 for obtaining additional information, such as, the vehicle identification number (VIN). The additional information may be, for example, in the form of a numeric code 134, or a bar code 136. OBT 100 also includes a cable 122 that is used to selectively place OBT 100 in circuit communication with a vehicle 130 on-board diagnostic system 138.

Cable 122 includes a first connector 124, preferably a Data Link Connector (DLC), such as for example a J1692 connector, and a second connector 126. Connector 124 is connectable to vehicle on-board diagnostic connector 132. Second connector 126 can be any type of connector and is preferably releasably connectable to the OBT 100. Optionally, cable 122 can be replaced with wireless transmitters and receivers. In such a case, wireless communication circuitry is connected to the on-board diagnostic system. In that case, preferably, the wireless communication circuitry is removably connectable to the vehicle diagnostic connector 132. However, optionally, wireless communication circuitry may be permanently installed in the vehicle 130 and accessed remotely by OBT 100.

OBT 100 further includes a housing 102, an "up" arrow key 114, a "down" arrow key 116, a read key 106, an erase key 108, a back key 110, an enter key 112 and a display 104. The "up" arrow key 114 and "down" arrow key 116 may be used to scroll through displays. The read key 106 may be used to initiate a request to the vehicle diagnostic system 138. The erase key 108 may be used to erase diagnostic trouble codes (DTC's) from the vehicle on-board diagnostic system 138. The back key 110 is used to return to the previous screen and enter key 112 is used to select items or tasks highlighted on the display 104.

Figure 1B:
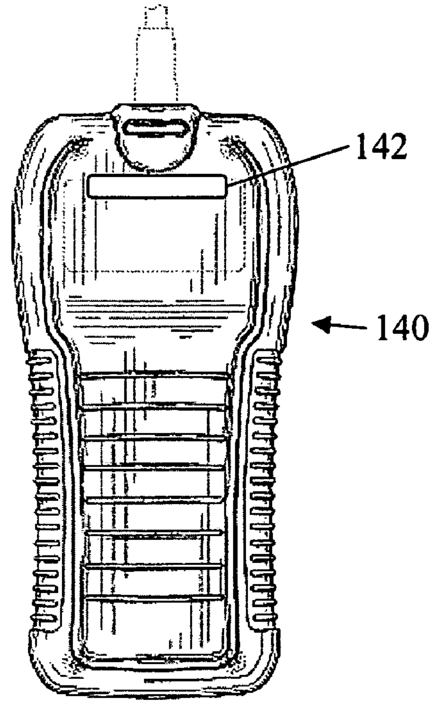
FIG. 1B is an exemplary embodiment of an OBT, wherein the OBT has an optical scanner on its back surface.
Figure 1C:
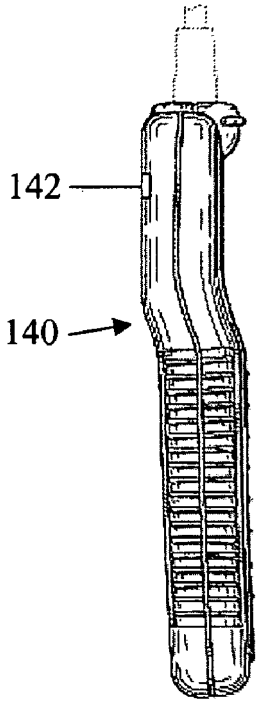
FIG. 1C is a side view of the exemplary embodiment illustrated in FIG. 1B.
Figure 1D:
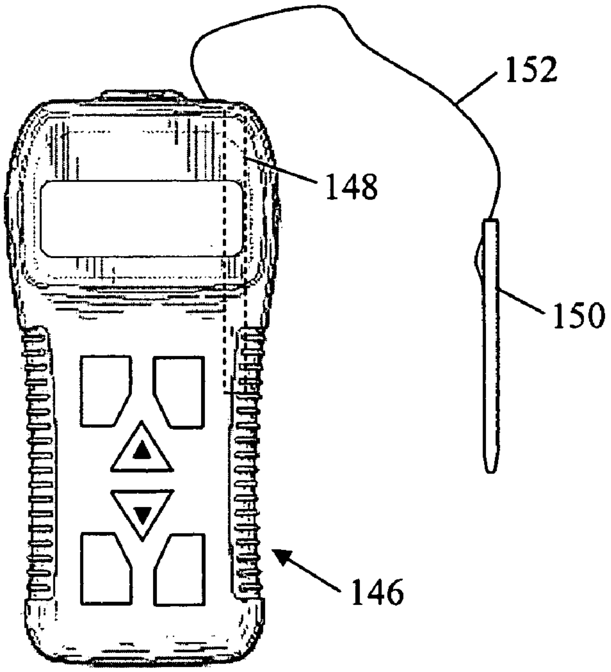
FIG. 1D is an exemplary embodiment of an OBT having an extendable hand-held optical scanner.

FIGS. 1B and 1C illustrate an exemplary embodiment of an OBT 140 having an optical scanner 142. OBT 140 is substantially similar to OBT 100 described above, except the optical scanner 142 is located in the rear of housing 144 FIG. 1D illustrates yet anther exemplary embodiment of an OBT 146. Again, OBT 146 is substantially similar to OBT 100, however, the optical scanner 150 is not integrated with OBT 146. In this exemplary embodiment, OBT 146 includes a hand-held optical scanner 150, such as, for example, a light pen scanner. Optical scanner 150 is connected to OBT 146 with a cable 152. Information obtained by optical scanner 150 is communicated to OBT 146 via the cable 152. In addition, OBT 146 contains a storage slot 148 for storing the optical scanner 150. Optionally, OBT 146 includes a first data port (not shown), and optical scanner 150 contains a second data port (not shown). The data ports are used to wirelessly communicate the information obtained by optical scanner 150, thus eliminating the need for cable 152. Still yet optical scanner 150 may be camera configured to capture images.

Figure 2A:
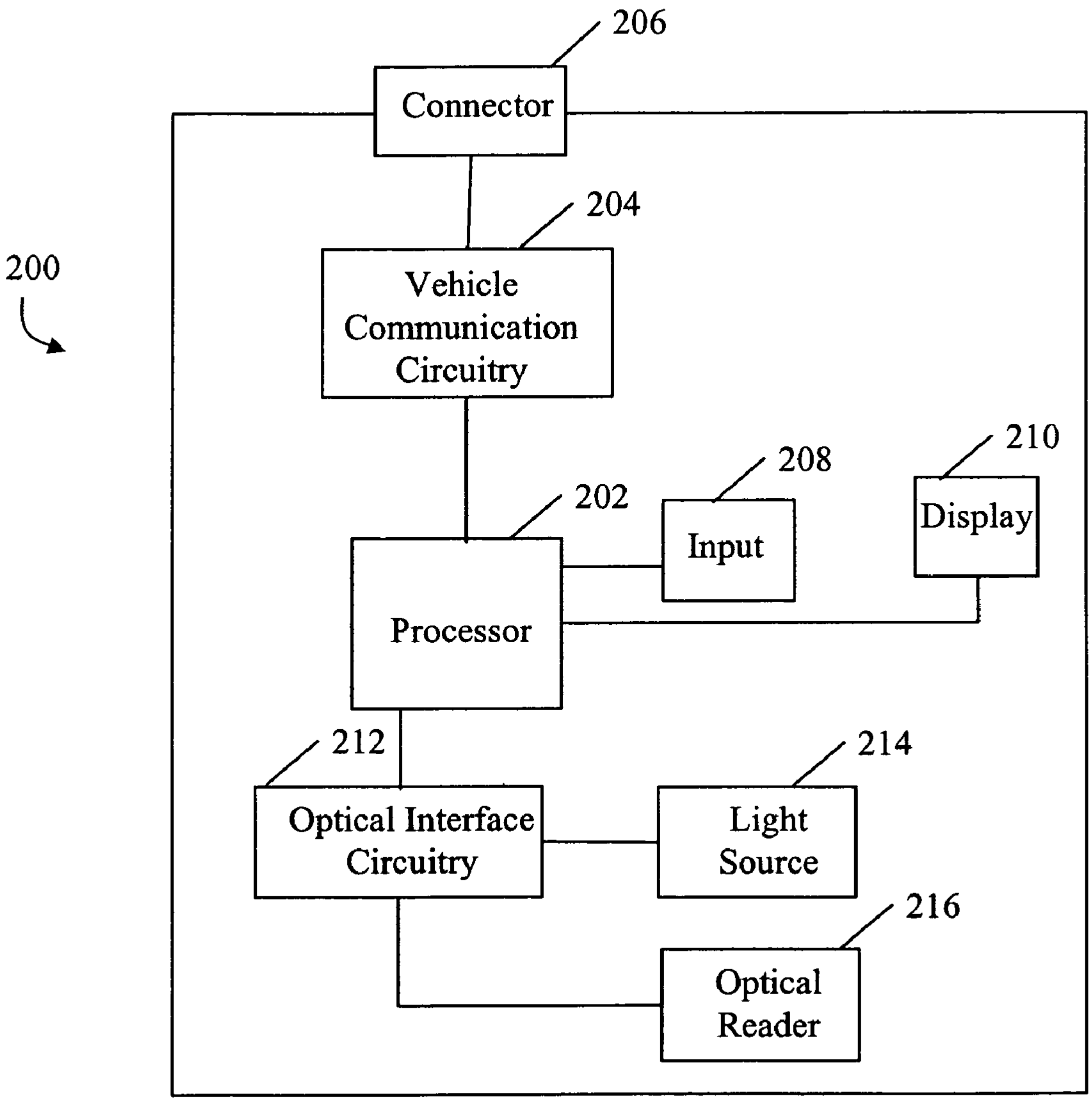
FIG. 2A is a high-level block diagram of an exemplary embodiment of an OBT having an integrated optical scanner.

FIG. 2A illustrates an exemplary embodiment of an off-board device, OBT 200. OBT 200 includes a processor 202 in circuit communication with vehicle communication circuitry 204 and optical interface circuitry 212. Vehicle communication circuitry 204 and optical interface circuitry 212 can be implemented either in hardware, or in software, or in a combination of hardware and software. In addition, OBT 200 includes connector 206, which provides a releasable connection point for a cable (not shown) for selectively placing OBT 200 in circuit communication with an on-board diagnostic system. An optional wireless communication system is illustrated in FIG. 2D having the vehicle communication circuitry located at vehicle data link connector. Optionally, connector 206 can be replaced with wireless communication circuitry for receiving data from the on-board diagnostic system.

Optical interface circuitry 212 is in circuit communications with a light source 214 and optical reader 216. Light source 214 and optical reader 216 are preferably at least partially retained by the housing (not shown) of OBT 200. Optionally, the light source 214 and/or optical reader 216 are contained in a separate housing and are placed in circuit communication with optical interface circuitry via a cable or wireless medium. Light source 214 can be any light source, such as for example a laser light source, or one or more LEDs. In the case of a bar code scanner, the light from the light source 214 is projected across the bar code. The light reflects off of the lines and spaces between the lines in the bar code. More light may be reflected by the space between the lines for example, than is reflected by the lines. The optical reader 216 receives the reflected light and determines whether the light is reflected by the lines or the space. The bar code is decoded by the optical interface circuitry 212 and communicated to the processor 202.

OBT 200 also includes an input 208 and a display 210 in circuit communication with the processor 202. The input 208 can be any type of input, such as for example, a touch screen, push buttons, selector switches, etc. Preferably, however, input 208 includes one or more keys, such as, for example, the arrow keys and input keys described above. In addition, display 210 can be any type of display, such as, for example, a liquid crystal display (LCD), binary displays, such as LEDs, textual displays, such as n character by m line LCD, or plasma displays, etc.

The processor circuit 202, also referred to herein as just processor 202, may be one of virtually any number of processor systems and/or stand-alone processors, such as microprocessors, microcontrollers, and digital signal processors, and has associated therewith, either internally therein or externally in circuit communication therewith, associated RAM, ROM, EPROM, flash memory, clocks, decoders, memory controllers, and/or interrupt controllers, etc. (all not shown) known to those in the art to be needed to implement a processor circuit. FIG. 2A shows a high-level block diagram of an exemplary OBT using an MC68306 processor to implement an off-board tool.

The processor 202 typically executes a computer program, code or logic, stored in its RAM, ROM, its EPROM and/or flash memory (all not shown), using data stored in any one or more of those memories. For example, the processor 202 may execute a computer program from a ROM (not shown) using data (e.g., codes) stored in flash memory. In general, the computer program executed by the processor 202 initializes the OBT 200 and generates a user interface, for example, using the input device(s) 208 through which a user causes the OBT 200 to communicate with the vehicle on-board diagnostic system to read certain data from the vehicle on-board diagnostic system, format such read data, and display the formatted data on the display 210 or communicate the data to a remote computer (not shown). Additionally, the computer program executed by the processor 202 causes the OBT 200 to optically scan additional information or data and to output the data to the display 210 the remote computer, or memory (not shown).

The vehicle communication circuitry 210 is used to facilitate generating one or more communications protocols with which the OBT 200 and the on-board diagnostic system communicate with one-another. Obviously, the vehicle communication circuitry 208 can be implemented either in hardware, or in software, or in a combination of hardware and software. Typical communications protocols generated by the vehicle communication circuitry 208 include, but are not limited to: SAE J1850 (VPW), SAE J1850 (PWM), ISO 9141-2, ISO 14230-4, and ISO 15765-4 The present invention is not intended to be limited to any specific protocol, however, or even to electrical communications protocols. Other present and future protocols, such as fiber optic and wireless communications protocols are also contemplated as being within the sprit and scope of various embodiments of the present invention.

When connected to the vehicle on-board diagnostic system, the OBT 200 establishes a communications link with the on-board diagnostic system in virtually any interface method, such as, for example, in Applicants U.S. Pat. No. 6,701,233, "Scan Tool with Dropped Communications Detection and Recovery and Improved Protocol Selection," which is incorporated by reference herein in it's entirety.

Upon establishing a communications link, the OBT can retrieve data, such as, for example, information or DTCs from the vehicle diagnostic system and provide an output having optically scanned information, such as the VIN number provided along with the retrieved data. Data as used herein is used broadly and includes, but is not limited to, at least one bit of information. The output can be to the display 210, a printer (not shown), a remote computer (not shown) or stored in internal memory for later use. This information can be used, for example, to determine if the vehicle complies with the CAA requirements.

Figure 2B:
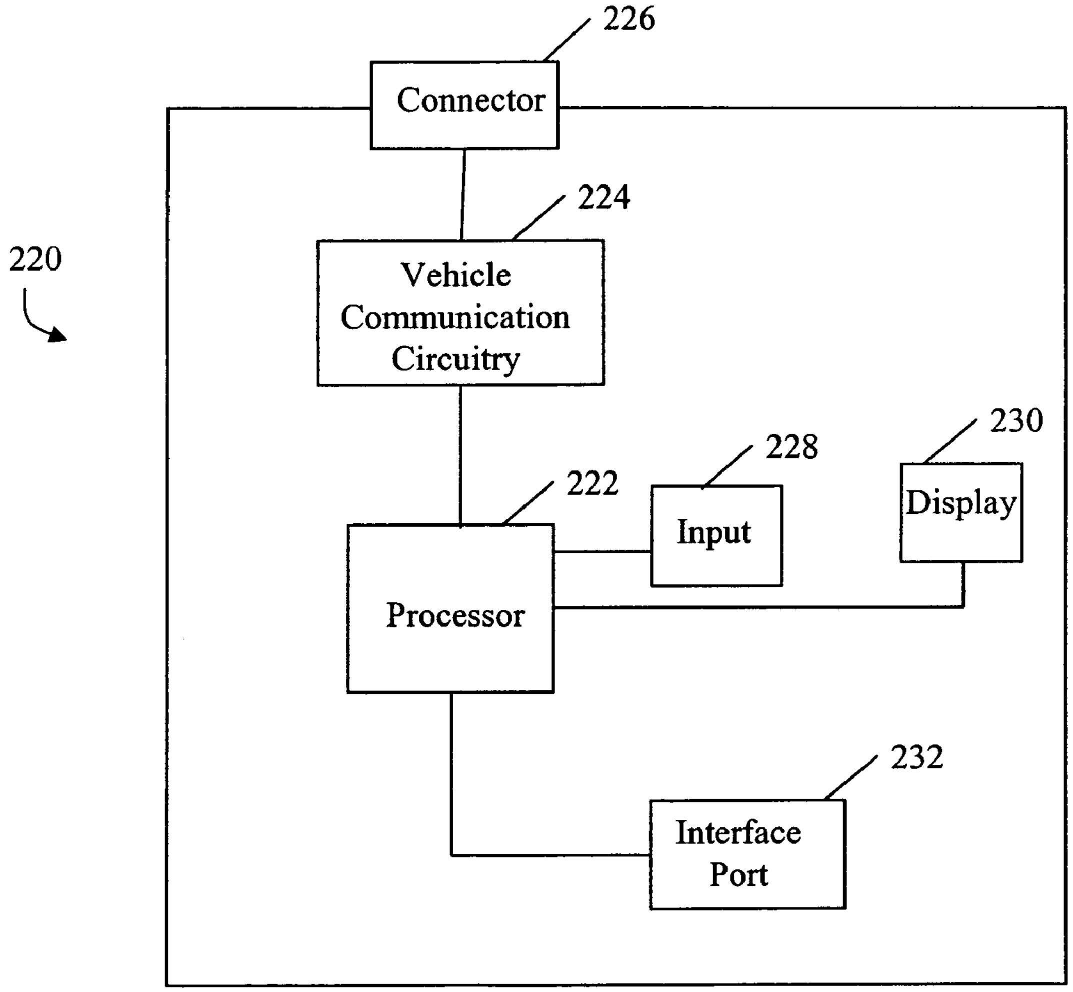
FIG. 2B is a high-level block diagram of an exemplary embodiment of an OBT having a communications port for accepting information from a modular optical reader.

FIG. 2B illustrates another exemplary embodiment of an off-board tool. OBT 220 includes a connector 226, vehicle communication circuitry 224, processor 222, input 228 and display 230 that are substantially the same as those described above with respect to FIG. 2A above. In addition, OBT 220 includes an interface port 232 in circuit communication with processor 202. Interface port 232 is configured to receive data from an optical scanner (not shown) such as, for example a light pen scanner. In one embodiment, the optical scanner (not shown) is battery powered and also includes an interface port. The optical scanner is used to obtain information, such as, for example the VIN number and is configured to download the information to OBT 220. Optionally, OBT 220 includes a housing (not shown) that includes a compartment for storing the optical scanner. Still yet, optionally, placing the optical scanner in the storage compartment causes an automatic downloading of the optically obtained information to OBT 220.

Figure 2C:
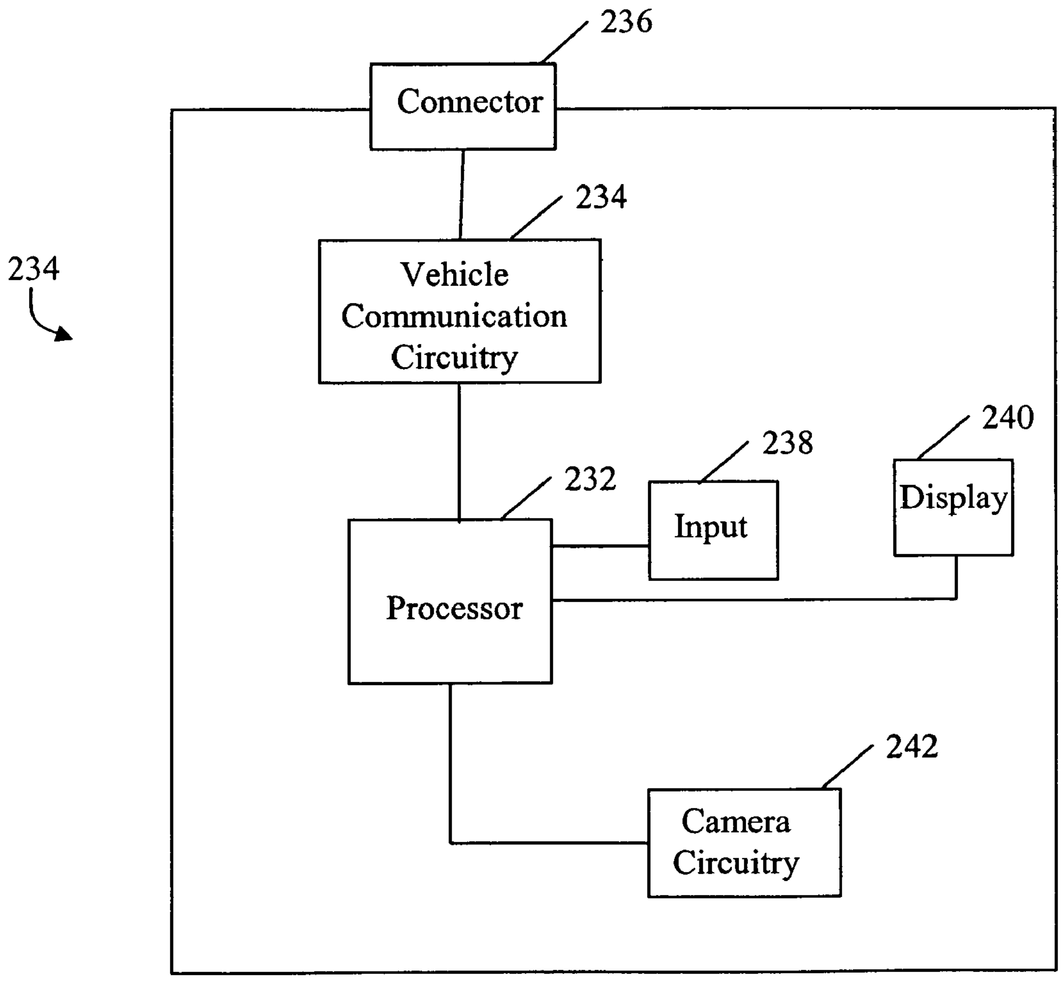
FIG. 2C is a high-level block diagram of an exemplary embodiment or an OBT having an integrated camera.
Figure 2D:
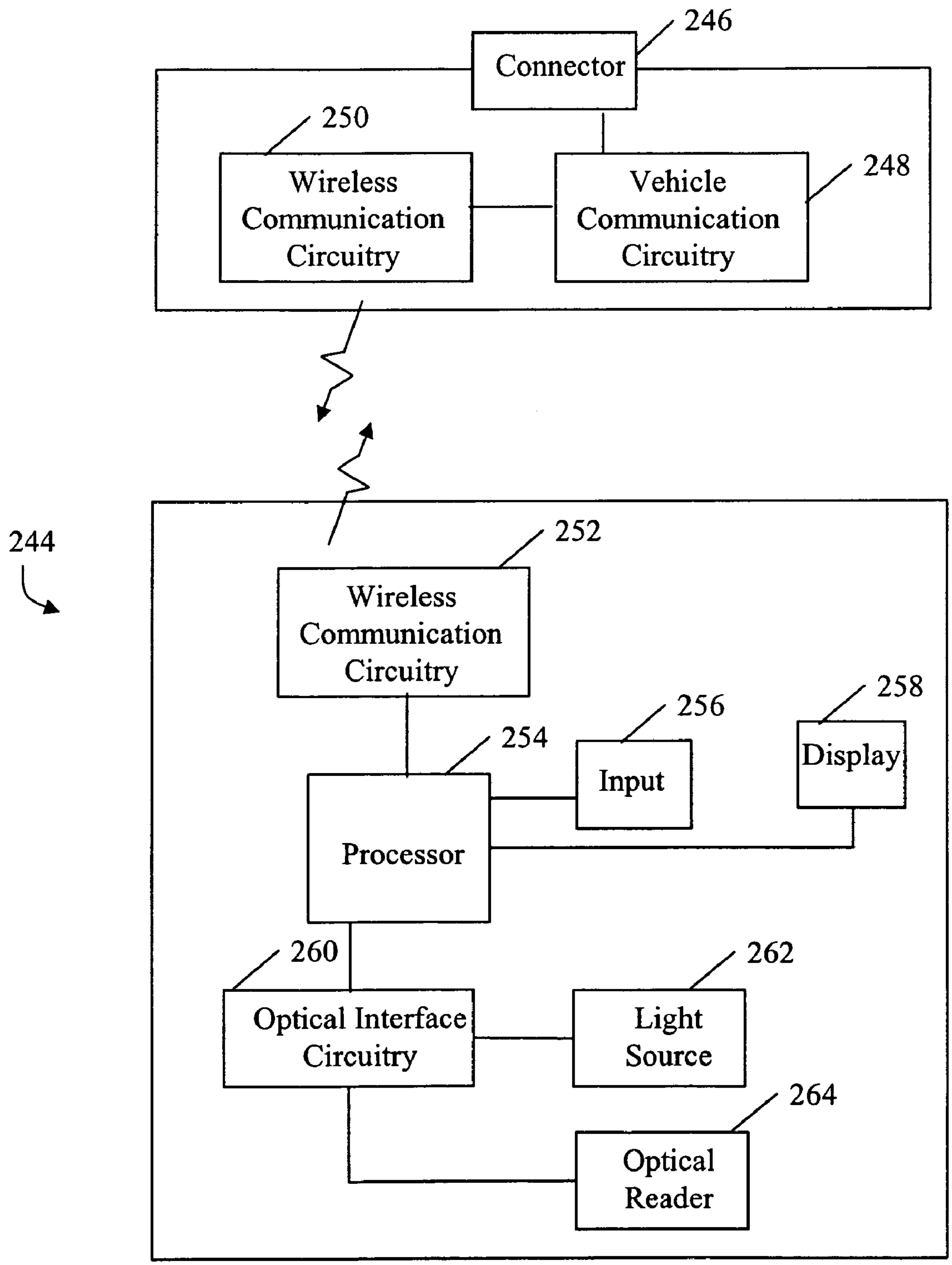
FIG. 2D is a high-level block diagram of an exemplary embodiment of an OBT having an optical sensor and wireless communication.

FIG. 2C illustrates yet another exemplary embodiment of an OBT 234. OBT 234 includes a connector 236, vehicle communication circuitry 234, processor 232, input 238 and display 240 that are substantially the same as those described with respect to FIGS. 2A and 2B above. In addition, OBT 234 includes camera circuitry 242. Camera circuitry 242 enables OBT 234 to capture digital images while using the off-board tool. The digital images can be communicated to a remote computer or stored in the OBT 234. The digital images can be used to aid in diagnosing problems with the vehicle by, for example, showing the images to an automotive technician, or communicating the images to a remote location for warranty verifications. Other uses include, capturing images of hard to view locations, such as, for example, the catalytic converter. In addition, the camera may be used to document parts that have been tampered with or to document that the MIL light is operational. The camera can also be used to capture live video data.

FIG. 2D illustrates yet another exemplary embodiment of an off-board tool having two sections, a vehicle interface unit 243 and a remote unit 244. The vehicle interface 243 includes a connector 236, vehicle communication circuitry 248 (both similar to that described above), and wireless communication circuitry 250. The wireless communication circuitry 250 is any wireless communication circuitry capable of communicating data between the vehicle interface 243 and the remote unit 244. The vehicle interface 243 is connectable to the vehicle diagnostic system via the data link connector. Optionally, vehicle interface 243 is permanently installed in the vehicle.

Remote unit 244 includes wireless communication circuitry 252 for communicating with the vehicle interface 243. Remote unit 244 also includes a processor 254, input 256 and display 258 that are substantially the same as those described with respect to FIG. 2A above. In addition, remote unit 244 includes optical imaging interface circuitry 260, light source 262 and optical reader 264. The optical imaging circuitry may be a bar code scanner, a camera or any other optical imaging circuitry.

An exemplary methodology for communicating with a vehicle diagnostic system and optically scanning additional information using an OBT is described below. The blocks shown represent functions, actions or events performed therein. If embodied in software, each block may represent a module, segment or portion of code that comprises one or more executable instructions to implement the specified logical function(s). If embodied in hardware, each block may represent one or more circuits or other electronic devices to implement the specified logical function(s). It will be appreciated that computer software applications involve dynamic and flexible processes such that the functions, actions or events preformed by the software and/or the hardware can be performed in other sequences different than the one shown.

Figure 3:
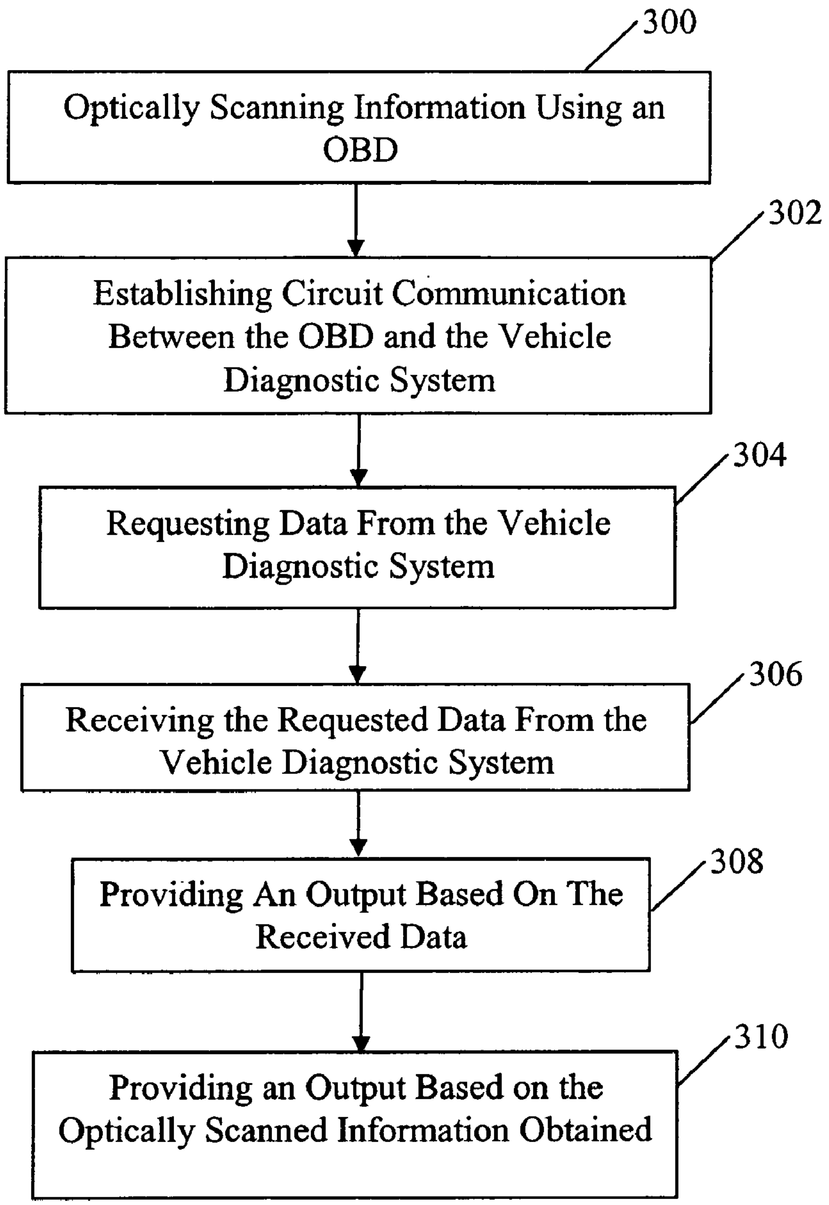
FIG. 3 is a flowchart illustrating an exemplary methodology of obtaining optically data and electronically obtained data from a vehicle diagnostic system using an OBT having an optical scanner.

FIG. 3 illustrates an exemplary methodology for communicating with a vehicle diagnostic system and optically scanning additional information using an OBT. The optically scanned additional information can be information not stored in the vehicle diagnostic system, or information that can be used to verify one or more pieces of data stored in the vehicle diagnostic system. Optionally, the system can also be used to detect fraud. If the optically scanned information is not consistent with the information obtained from the vehicle diagnostic system, the user can be alerted to the possible fraud or an error with the equipment. The methodology begins at block 300 wherein the OBT is used to obtain information related to the vehicle, such as, for example the VIN number. The information is obtained by optically scanning the actual information, such as, for example, the VIN number itself, or by scanning information indicative of the VIN number, such as, for example, a bar code. Preferably, when optically scanning the actual information, optical character recognition (OCR) software is used so that the information can be obtained and transmitted to a remote computer (not shown) in a computer readable format.

A communication circuit is established between the OBT and the vehicle diagnostic system at block 302. The communication circuit can be established by any method, including linking with the vehicle using a communications protocol, such as, for example SAE J1850 (VPW), SAE J1850 (PWM), ISO 9141-2, ISO 14230-4, or ISO 15765-4. Upon establishing circuit communication with the vehicle diagnostic system, the OBT requests data from the vehicle diagnostic system, such as, for example, a request for all DTCs at block 304. At block 306, the OBT receives the requested data from the vehicle and provides and output based, at least in part, on the requested data at block 308. The output is provided to the OBT display, or optionally communicated to a remote computer or printer. In addition, the OBT provides an output based on the optically scanned information at block 310. Again, the output is provided to the OBT display, or optionally communicated to the remote computer or printer. The output can be used to determine, for example, if the vehicle complies with the state emissions program.

While the present invention has been illustrated by the description of embodiments thereof, and while the embodiments have been described in some detail, it is not the intention of the applicant to restrict or in any way limit the scope of the appended claims to such detail. Additional advantages and modifications will readily appear to those skilled in the art, for example, adding modular components that connect to the OBT. Therefore, the invention in its broader aspects is not limited to the specific details, representative apparatus and methods, and illustrative examples shown and described. Accordingly, departures may be made from such details without departing from the spirit or scope of the applicant's general inventive concept.

We claim:

1. An off-board tool (OBT) comprising a processor and in circuit communication with:

a) vehicle communication circuitry for linking to a vehicle diagnostic system and obtaining vehicle identification information;

b) an optical scanner for optically obtaining vehicle information including a vehicle identification number (VIN);

c) memory; and d) an output device;

wherein the memory comprises logic for causing the OBT to link with the vehicle diagnostic system, logic for retrieving diagnostic data from the vehicle diagnostic system and logic for causing the optical scanner to optically obtain vehicle information.

2. The OBT of claim 1 wherein the output device comprises a display located on the OBT.

3. The OBT of claim 1 wherein the vehicle information is one of a numeric code, an alphabetic code, an alphanumeric code or a bar code.

4. The OBT of claim 3 further comprising logic for optical character recognition.

5. The OBT of claim 1 wherein the optical scanner comprises a bar code scanner.

6. The OBT of claim 1 wherein the optical scanner comprises a camera sensor.

7. The OBT of claim 1 wherein the optical scanner comprises a laser sensor.

8. The OBT of claim 1 wherein the optical scanner is an integral part of the OBT.

9. The OBT of claim 1 wherein the optical scanner further comprises its own housing.

10. The OBT of claim 1 wherein the optical scanner comprises at least one light source and at least one light sensor.

11. The OBT of claim 10 wherein the at least one light source is a light emitting diode.

12. The OBT of claim 10 wherein the at least one light sensor is a light sensing diode.

13. The OBT of claim 1 further comprising wireless communication circuitry.

14. The OBT of claim 13 further comprising a remote unit and a vehicle interface unit.

15. The OBT of claim 14 wherein the vehicle interface unit is connectable to the vehicle diagnostic system.

16. The OBT of claim 14 wherein the vehicle interface unit is permanently attached to the vehicle diagnostic system.

17. An automotive diagnostic tool comprising:

a) a processor;

b) means for retrieving at least one bit of data from a vehicle diagnostic system including vehicle identification information;

c) means for optically obtaining at least one piece of vehicle specific information including a vehicle identification number (VIN); and d) memory;

wherein the processor, the means for retrieving at least one bit of data from a vehicle diagnostic system, the means for optically obtaining at least one piece of vehicle specific information and the memory are in circuit communication with one another.

18. The scan tool of claim 17 wherein the means for retrieving at least one bit of data from a vehicle diagnostic system comprises logic for establishing a communications protocol with the vehicle diagnostic system.

19. The scan tool of claim 18 wherein the means for retrieving at least one bit of data from a vehicle diagnostic system further comprises logic for requesting data indicative of the vehicle emissions.

20. The scan tool of claim 17 wherein the means for optically obtaining at least one piece of vehicle specific information comprises logic for optical character recognition.

21. The scan tool of claim 17 wherein the means for optically obtaining at least one piece of vehicle specific information comprises logic for reading a bar code.

22. The scan tool of claim 17 wherein the means for optically obtaining at least one piece of vehicle specific information comprises a camera.

23. A method of performing a test on a vehicle having a vehicle diagnostic system comprising:

optically scanning vehicle information including a vehicle identification number using an off-board tool (OBT);

establishing circuit communication between the OBT and the vehicle diagnostic system;

requesting at least one bit of data from the vehicle diagnostic system;

receiving the at least one bit of data from the vehicle diagnostic system regarding identification of the vehicle;

providing an output as a function of the at least one bit of data; and providing an output as a function of the optically scanned vehicle information obtained.

24. The method of claim 23 wherein optically scanning vehicle information using an OBT comprises optically scanning the vehicle identification number.

25. The method of claim 23 wherein optically scanning vehicle information using an OBT comprises optically scanning a bar code.

26. The method of claim 23 wherein optically scanning vehicle information using an OBT comprises optically scanning vehicle specific information with a modular component of the scan tool.

27. The method of claim 23 wherein optically scanning vehicle information using an OBT comprises optically scanning vehicle specific information with a integrated component of the scan tool.

28. The method of claim 23 wherein optically scanning vehicle information using an OBT comprises optically scanning vehicle specific information with a camera.

29. A method of performing a test on a vehicle having a vehicle diagnostic system comprising:

optically scanning vehicle information using an off-board tool (OBT);

establishing circuit communication between the OBT and the vehicle diagnostic system;

requesting at least one bit of data from the vehicle diagnostic system;

receiving the at least one bit of data from the vehicle diagnostic system;

providing an output as a function of the at least one bit of data;

providing an output as a function of the optically scanned vehicle information obtained, wherein optically scanning vehicle information using an OBT comprises optically scanning vehicle specific information with a camera, and storing an image of the malfunction indication light.

30. A method of performing a test on a vehicle having a vehicle diagnostic system comprising:

optically scanning vehicle information using an off-board tool (OBT);

establishing circuit communication between the OBT and the vehicle diagnostic system;

requesting at least one bit of data from the vehicle diagnostic system;

receiving the at least one bit of data from the vehicle diagnostic system;

providing an output as a function of the at least one bit of data;

providing an output as a function of the optically scanned vehicle information obtained, wherein optically scanning vehicle information using an OBT comprises optically scanning vehicle specific information with a camera, and storing an image of a part that has been tampered with.

31. A method of performing a test on a vehicle having a vehicle diagnostic system comprising:

optically scanning vehicle information using an off-board tool (OBT);

establishing circuit communication between the OBT and the vehicle diagnostic system;

requesting at least one bit of data from the vehicle diagnostic system;

receiving the at least one bit of data from the vehicle diagnostic system;

providing an output as a function of the at least one bit of data;

providing an output as a function of the optically scanned vehicle information obtained, wherein optically scanning vehicle information using an OBT comprises optically scanning vehicle specific information with a camera, and obtaining an image of a part that is difficult to see.

* * * * *